J. WARWICK.
SULKY-PLOW.
No. 177,975. Patented May 30, 1876.
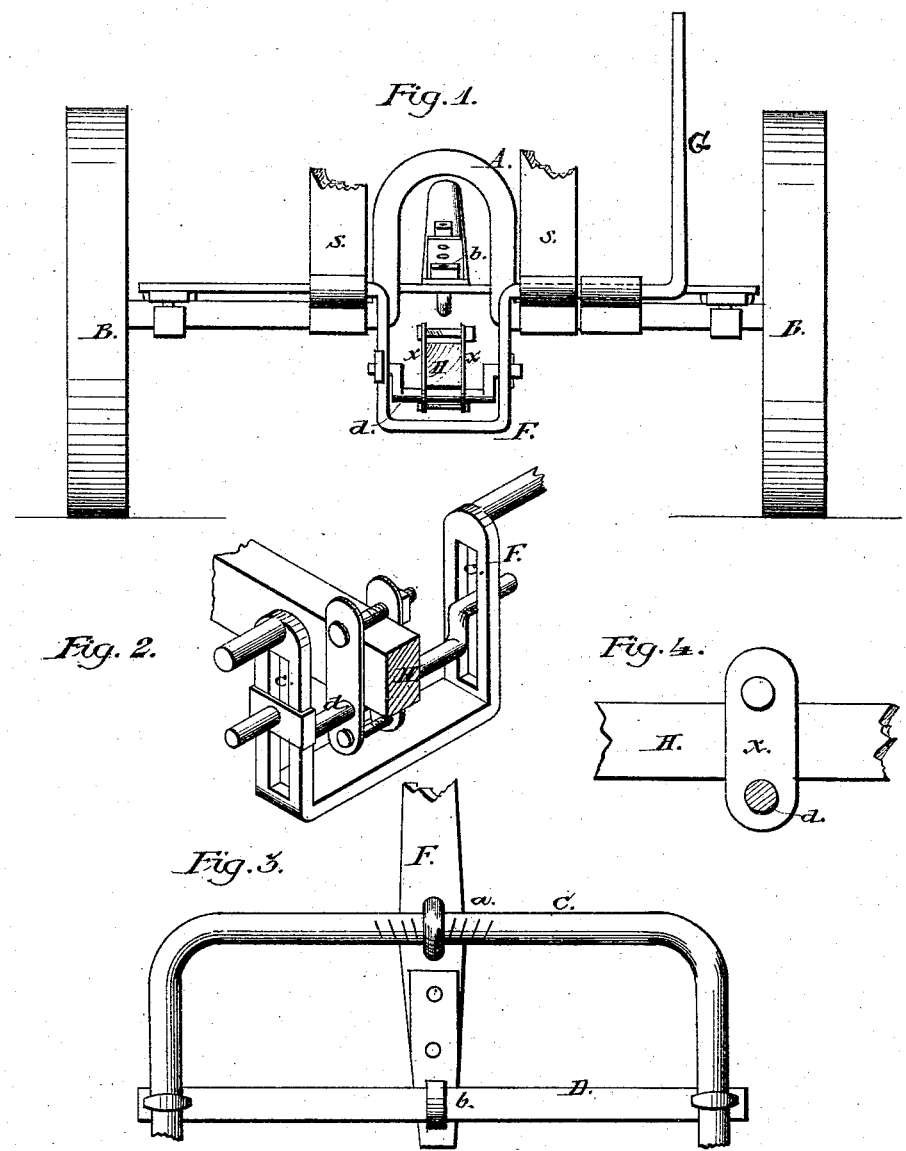

UNITED STATES PATENT OFFICE

JOSEPH WARWICK, OF FRANKLIN, OHIO, ASSIGNOR OF TWO-THIRDS HIS RIGHT TO MOSES SMITH AND PERRY LUKENS.

IMPROVEMENT IN SULKY-PLOWS.

Specification forming part of Letters Patent No. 177,975, dated May 30, 1876; application filed October 9, 1875.

*To all whom it may concern:*

Be it known that I, JOSEPH WARWICK, of Franklin, in the county of Warren and State of Ohio, have invented a new and useful Improvement in Sulky-Plows; and I do hereby declare that the following is a full, clear, and exact description thereof, reference being had to the accompanying drawings, and to the letters of reference marked thereon.

Figure 1 represents a rear elevation of my improved plow, with the seat removed. Fig. 2 represents the hinged or swinging frame in which the plow-beam is suspended or hung. Fig. 3 represents the under side of the tongue, and its adjustable connection with the frame. Fig. 4 represents the side of the plow-beam, with one of the plates between which it is clamped.

My invention relates to the manner of hanging the plow, to give it freedom of lateral oscillation and vertical play in relation to the carriage or sulky.

In the drawings, A denotes a bent axle supported by the wheels B. The tongue-frame consists of the curved bar of round iron C, secured to the axle near each wheel, and the cross-piece D. The tongue E is secured by hook-head bolts at *a b* to the frame C D, and it may be adjusted at an angle to the line of draft, so as to cause the plow to take a furrow of any desired width, and also it may be adjusted laterally to accommodate the use of three horses.

The hanging frame F is hinged in sockets or loops behind axle A, and is provided with a hand-lever, G, which may be held by a ratchet-bar in any position required to elevate and hold the hinged frame F in which the plow is secured.

Slots *c c* are formed in the sides of frame F, in which the peculiarly-formed yoke *d* is suspended, and upon yoke *d* the plow-beam H is secured between two plates, *x x*, which work freely upon yoke *d*, which passes through their lower ends.

Yoke *d* is made with shoulders, which fit and work up and down between the slotted sides of frame F and maintain an angle to the horizontal plane of the bottom of the frame F. Yoke *d*, with the plow-beam secured upon it, rises and falls in the slots *c c* as the wheels B pass over obstacles, or, in other words, the slotted frame partakes of the rising and falling action of the machine, while the slots *c c* allow the yoke *d*, which carries the plow, to maintain its relation to a horizontal plane.

Yoke *d*, and the plow secured by plates *x x* upon it, are arranged in the frame F to maintain an angle to a horizontal plane, as represented, and by this arrangement the plow always assumes a horizontal plane when one wheel of the carriage follows in the furrow and the other is on the unplowed land; and when the frame F is raised up by lever G the yoke *d* with the plow will assume a horizontal position while wheels B are on the same plane. This is important in finishing up lands, and both wheels are below the surface of the unplowed land.

A seat for the plowman is supported upon suitable springs *s s*, partly broken away in Fig. 1.

The holes in the plates *x x*, through which yoke *d* is inserted, are larger than the diameter of the yoke, so that the plow may oscillate freely, as is generally the case when a plow is held by a plowman in the ordinary way. By allowing this freedom of lateral vibration to the plow the labor of the team is much relieved.

When it is required to raise the plow out of the ground the sulky need not be backed for the purpose, because the lever G will swing the frame F with the plow rearward and upward in the arc of a circle.

By reversing the position of the yoke *d* a left-hand plow may be used.

The team will be hitched to the front end of plow-beam H, while the tongue E governs the course of the plow, and the sulky serves to support the driver and to carry the mechanism which affords the free lateral and vertical action to the plow, as described.

I claim—

The slotted hinged frame F, in combination with the inclined self-adjusting yoke *d*, to which the plow is connected, substantially as and for the purpose described.

Witness my hand this 26th day of August, 1875.

JOSEPH WARWICK.

Witnesses:
M. DECHAUT,
C. SHIRLY.